United States Patent [19]
Knapp

[11] 4,152,046
[45] May 1, 1979

[54] LIGHT REFLECTING DELINEATOR

[75] Inventor: George A. Knapp, DeWitt, N.Y.

[73] Assignee: Deanna M. Knapp, DeWitt, N.Y.

[21] Appl. No.: 879,462

[22] Filed: Feb. 21, 1978

[51] Int. Cl.² .............................................. G02B 5/24
[52] U.S. Cl. ..................................... 350/103; 350/97
[58] Field of Search ................................ 350/97–105; 404/12; D10/111, 113, 121

[56] References Cited

U.S. PATENT DOCUMENTS

| D. 92,574 | 9/1933 | Bergen et al. | D10/111 |
| D. 125,126 | 2/1941 | Bryson | D10/111 |
| 1,399,923 | 12/1921 | Bergen | 350/107 |
| 2,703,773 | 3/1955 | Stimson | 350/103 |
| 3,029,702 | 4/1962 | Ruppert | 350/105 |
| 3,119,894 | 1/1964 | Nagel et al. | 350/103 |

FOREIGN PATENT DOCUMENTS

| 2315076 | 10/1973 | Fed. Rep. of Germany | 350/103 |
| 695747 | 8/1953 | United Kingdom | 350/103 |

Primary Examiner—Vincent P. McGraw
Assistant Examiner—B. W. de los Reyes
Attorney, Agent, or Firm—Bruns & Jenney

[57] ABSTRACT

A light reflecting delineator particularly adapted for delineating or marking the edges of road shoulders, bridges, abutments or other areas or objects that should be marked for the safety of motorists. The delineators are preferably of the reflex reflector type and are formed with a relatively small radius arcuate configuration in at least one plane which greatly improves their performance. Thus, the delineators reflect the light of an approaching vehicle over a far greater angular distance than do the conventional flat faced delineators in common use. The arcuate configuration of the delineators may take the form of a portion of a sphere, or a cylinder or a portion thereof.

9 Claims, 12 Drawing Figures

LIGHT REFLECTING DELINEATOR

BACKGROUND OF THE INVENTION

This invention relates generally to reflectors, and has particular reference to a novel light reflecting delineator having an arcuate reflecting surface, the delineator being specially adapted for highway use.

At the present time it is common practice to delineate or mark the edges of road shoulders by substantially flat faced delineators or reflectors supported by posts 50 to 100 feet apart. Ramps, bridges, abutments and the like are similarly marked. The delineators that are most commonly used are flat, circular reflex reflector discs made of a material such as methylmethacrylate or flat rectangular plates coated with a reflective material. These discs or plates are mounted on their support posts so that their faces or flat reflective surfaces are tipped inwardly 3° from a vertical plane perpendicular to the road centerline.

The delineator discs and plates referred to just above were originated for use as auxiliary safety devices on the rear and front of vehicles, the devices serving to warn approaching vehicles with lights on of the presence of a darkened parked vehicle or of one whose lighting system may be damaged or inoperable. This being the case, these delineators have maximum reflectiveness on a line or axis perpendicular to the face of the delineator and passing through the center thereof. The amount of reflection or the intensity of the reflection drops sharply on either side of, or above or below, the axis.

With a vehicle travelling at night on a highway, the axis of each flat faced delineator is only briefly within the beam spread of the headlights and thereafter the amount of reflection drops quickly to zero. If the delineators are relatively far apart, there may be intervals between them when the vehicle receives no reflected light. In addition to the problem of only limited intervals of high reflectiveness, if the support posts for the conventional flat faced delineators are twisted or bent, as happens frequently, the reflecting surfaces may be out of the headlight beam altogether and thus unable to reflect any light.

SUMMARY OF THE INVENTION

The light reflecting delineator of the invention is preferably of the reflex reflector type and comprises a light reflecting portion having reflex reflector prisms molded in the inner side thereof and a backing portion hermetically sealed to the inner side of the light reflecting portion. The backing portion includes mounting lugs that are engageable with the support post for the delineator and, in one form of the invention, a lock plate engages the delineator and coacts with the lugs to secure the delineator in position on the post. In another form of the invention, the delineator is formed of two complementary parts which when assembled coact with the mounting lugs to secure the delineator in position on the post.

The light reflecting portion of the delineator is formed with a relatively small radius arcuate configuration in at least one plane. Preferably, this portion of the delineator is a portion of a sphere but it can also be a portion of a cylinder or a complete cylinder. The arcuate configuration of the delineator operates to greatly improve its performance as will be explained hereinafter.

DESCRIPTION OF THE PREFERRED EMBODIMENTS

Figure 1:
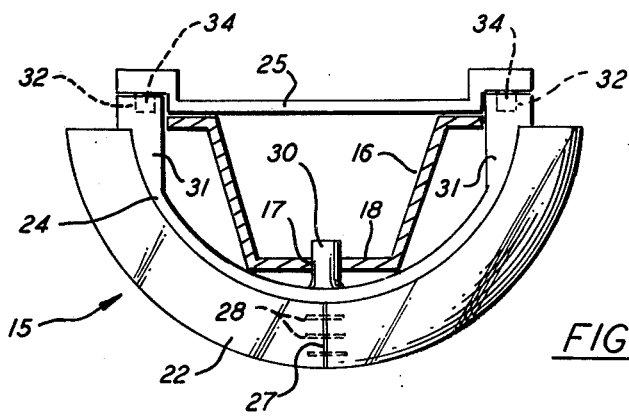
FIG. 1 is a top plan view of a light reflecting delineator embodying the invention, the support post for the delineator being shown in section.
Figure 2:
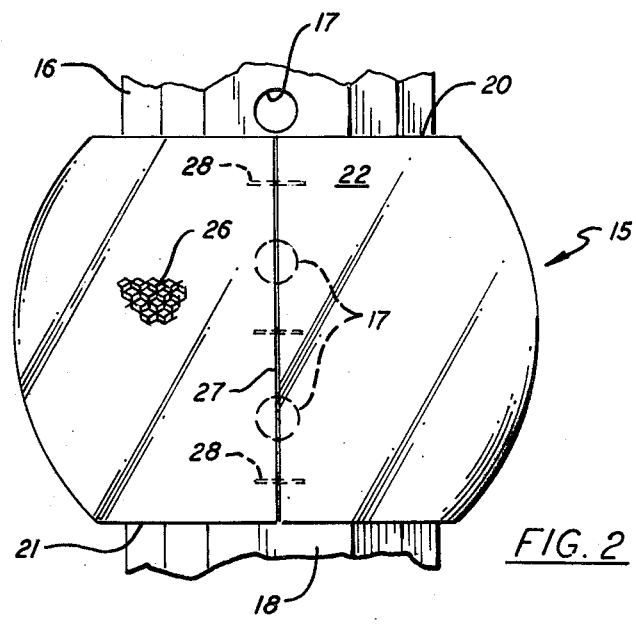
FIG. 2 is a front elevational view of the delineator of FIG. 1.

Having reference now to the drawings, and with particular reference to FIGS. 1 and 2, the reference number 15 generally indicates a light reflecting delineator that is mounted on a support post 16 a predetermined distance above the ground. The post 16 is a conventional, substantially U-shaped steel post of a predetermined standard length, the post having a series of uniformly spaced mounting holes 17 in its outer wall or web 18.

In accord with the invention, the delineator 15 has an arcuate configuration in both the horizontal and vertical planes and, in the embodiment shown, is a portion of a hollow sphere. Thus, the delineator is basically a hemispherical shell with diametrically opposite equal segments removed whereby the top and bottom edges 20 and 21 of the delineator lie in parallel, substantially horizontal planes.

The delineator 15 is comprised of an outer light reflecting portion 22, an inner backing portion 24 and a locking plate 25. The light reflecting portion 22 is a lens of a material such as methylmethacrylate, the outer surface of the lens being smooth and the inner surface having conventional reflex reflector prisms molded therein. The prisms may be seen through the lens and are indicated at 26 in FIG. 2. The lens portion 22 may be molded as one 180° section or two 90° sections depending on tooling practice. In the latter case, the two sections will be secured together along the line 27 as by an adhesive and/or pins 28.

The backing portion 24 of the delineator 15 is hermetically sealed to the inner surface of the lens portion 22 to protect the molded prisms from the weather and physical damage. To this end, the portion 24 is made of a strong, weather resistant material such as "Cycolac". The inner surface of the backing portion is provided with two or more projecting lugs 30 which register with the post holes 17 and are received therein as shown in FIG. 1.

The backing portion 24 is formed adjacent its side edges with thickened portions 31, and these have a series of holes 32 in which lugs 34 on the locking plate 25 are received. If desired, an adhesive can be used to prevent removal of the locking plate. With the locking plate in position, the delineator cannot be removed from the support post and it cannot be moved up or down on the post due to the engagement of the lugs 30 in the holes 17.

Figure 3:
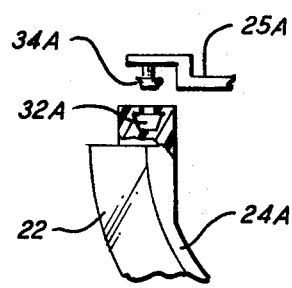
FIGS. 3 and 4 are fragmentary views, partly in section, corresponding to the left side of FIG. 1 and showing alternative means for securing the locking plate to the delineator.
Figure 4:
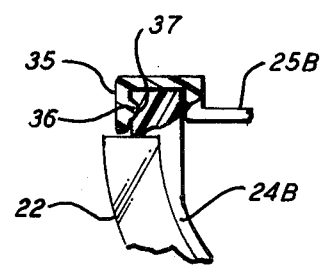

FIGS. 3 and 4 illustrate alternative ways of connecting the locking plate to the delineator backing portion. In FIG. 3, locking plate 25A is provided with a shouldered lug 34A that is inserted in a correspondingly shouldered hole 32A in the backing portion 24A to lock the parts together, the material of the parts being sufficiently compressible and resilient to allow the insertion of the lug. In FIG. 4, the locking plate 25B is provided with an edge flange 35 having on its inside surface a bead 36 that snaps into a corresponding groove 37 in the backing portion 24B.

Figure 5:
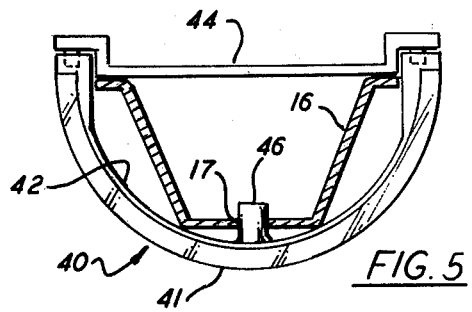
FIGS. 5 and 6 are top plan and front elevational views, respectively, of a modified form of the delineator.
Figure 6:
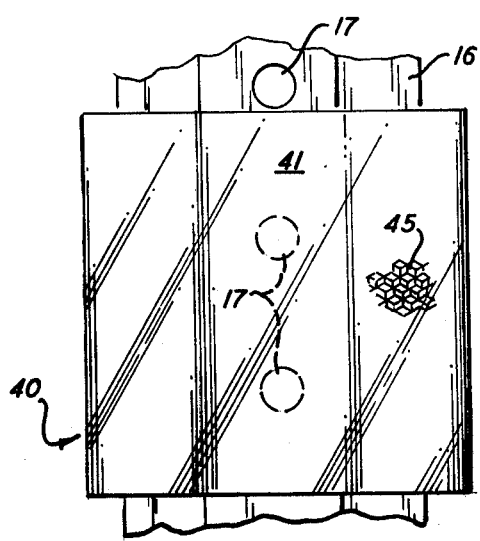

FIGS. 5 and 6 illustrate a modified form of the invention wherein the delineator, generally indicated at 40, has an arcuate configuration in the horizontal plane only whereby it has an essentially semi-cylindrical shape as best shown in FIG. 5. Other than as to its shape, the delineator 40 is constructed like delineator 15 and comprises an outer light reflecting or lens portion 41, an inner backing portion 42 and a locking plate 44. The inner surface of the lens portion 41 has conventional reflex reflector prisms molded therein as indicated at 45 in FIG. 6. The backing portion 42 includes lugs 46 that are received in holes 17 in the post 16. The locking plate 44, while shown as being connected to the backing portion in the same manner as shown in FIG. 1, can also be connected in either of the ways shown in FIGS. 3 and 4.

Figure 7:
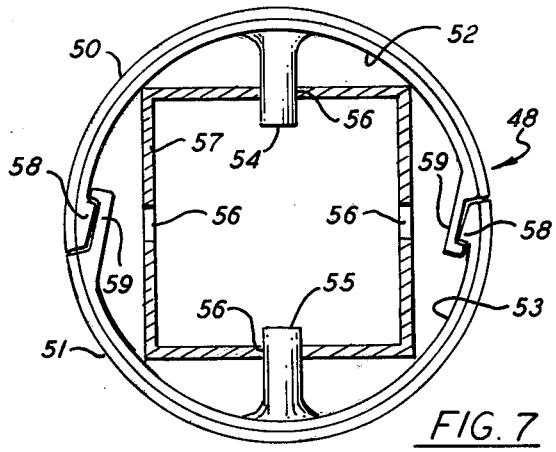
FIGS. 7 and 8 are top plan and front elevational views, respectively, of another modification of the delineator.
Figure 8:
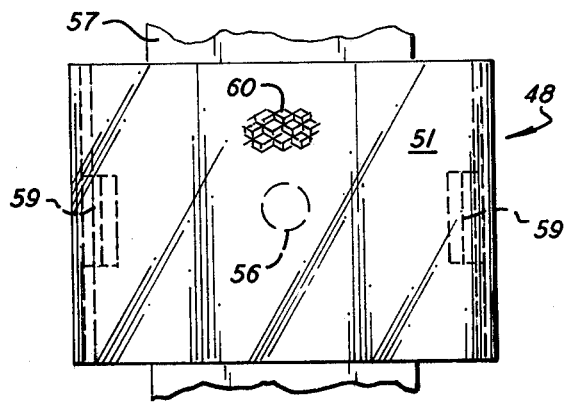

FIGS. 7 and 8 illustrate another modification of the invention wherein the delineator 48 comprises a pair of complementary semi-cylindrical parts 50 and 51 which when assembled together form a cylinder as best shown in FIG. 7. This construction is particularly adapted for use where reflection throughout a 360° field may be desired and can, for example, employ a white lens on one side and a red lens on the other to indicate go-no-go situations as in the area of access and exit ramps for limited access highways.

The modification of FIGS. 7 and 8 is also particularly adapted for use with a hollow, square or round support post and the backing portions 52,53 of the halves 50,51 are respectively formed with lugs 54,55 that are received in holes 56 in the post 57, a square post being shown in the illustrated embodiment. The backing portions of the delineator halves are formed with complementary ramps 58 and locking latches 59 which can be snapped into engagement to secure the parts together. When so assembled, the delineator 48 cannot be removed from the support post and cannot be moved up or down on it due to the engagement of the lugs 54,55 in the holes 56.

Other than as described just above, delineator 48 is constructed like delineator 15, FIGS. 1 and 2, the lens portions of the delineator having conventional reflex reflector prisms molded in the inner surfaces thereof as indicated at 60 in FIG. 8. In this connection, it should be noted that two delineators constructed as shown in FIGS. 1 and 2 can also be assembled together to form a 360° reflector as shown in FIGS. 7 and 8.

Figure 9:
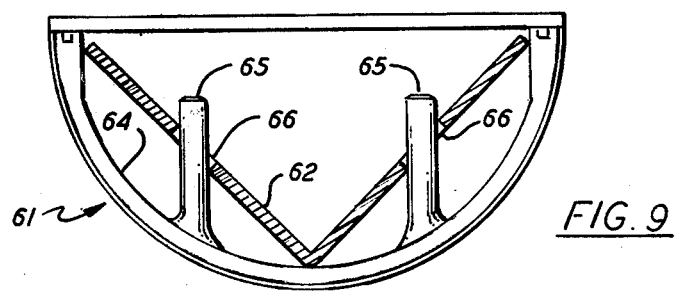
FIGS. 9 and 10 are top plan and front elevational views, respectively, of still another modification of the invention.
Figure 10:
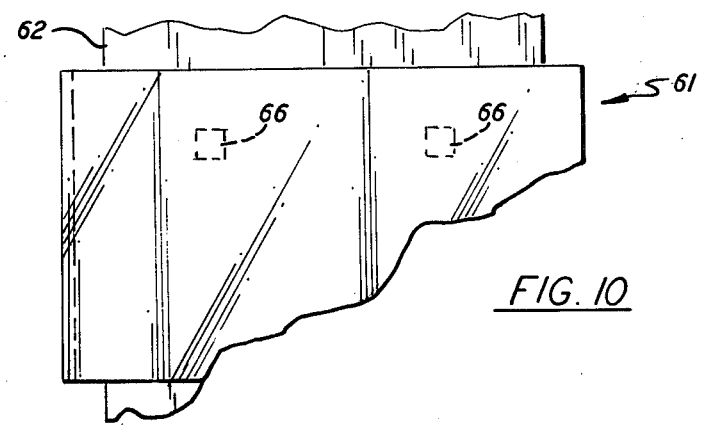

FIGS. 8 and 9 illustrate another modification of the invention wherein the delineator 61 is adapted for use with a right angle type post 62. The construction of delineator 61 is identical to that of delineator 40, FIGS. 5 and 6, except that the backing porton 64 is formed with two or more pairs of horizontally spaced lugs 65 that are received in holes 66 in the support post 62.

Figures 11, 12:
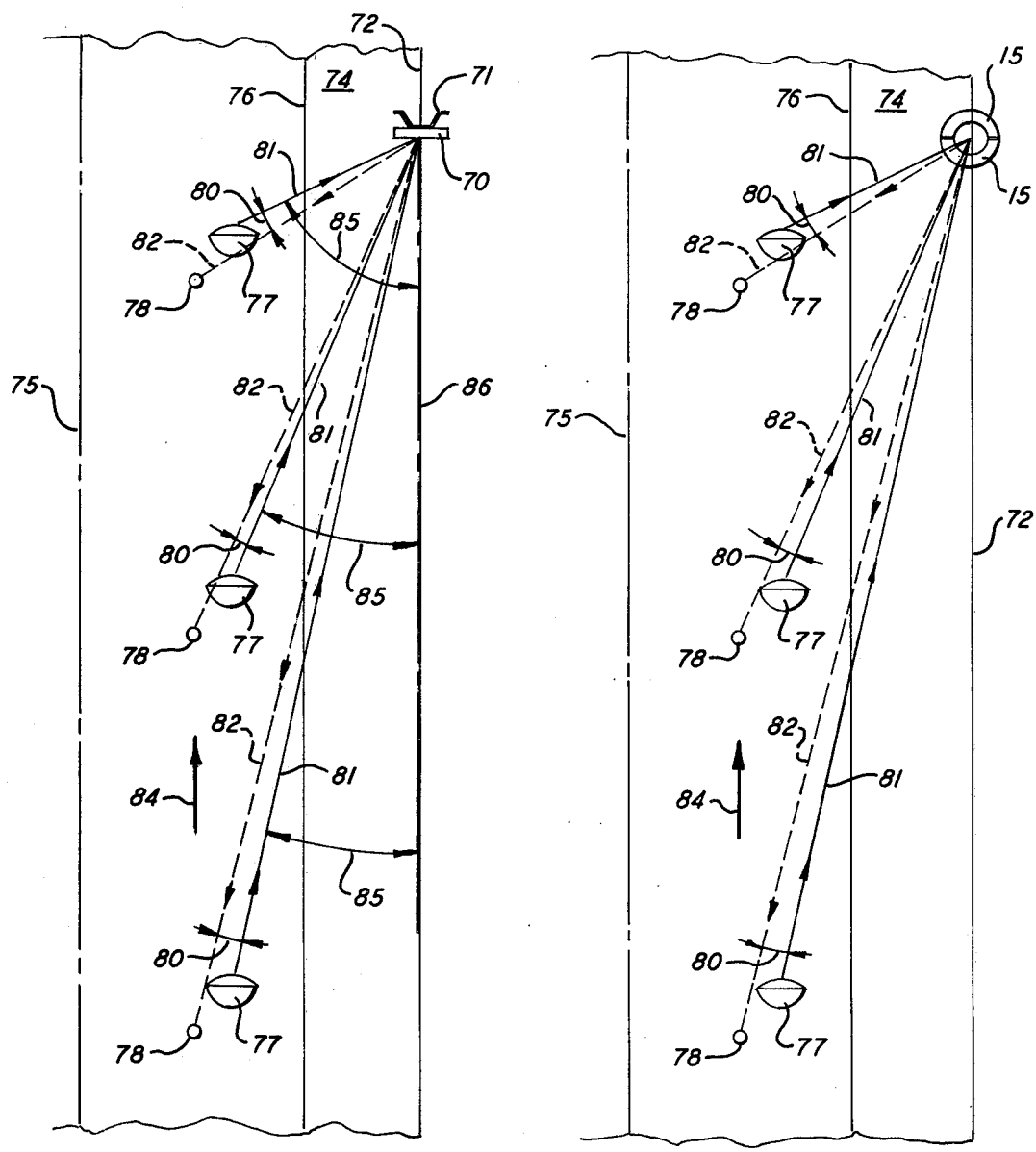
FIG. 11 is a diagram showing reflected light beam patterns as the relationship between the light source and a conventional flat faced delineator changes.
FIG. 12 is a corresponding diagram showing reflected light beam patterns as the relationship between the light source and a delineator embodying the invention changes.

Referring now to the diagram of FIG. 11, reference number 70 indicates a conventional flat faced delineator disc mounted on a post 71 at the outer edge 72 of the shoulder 74 of a highway. The highway centerline is shown at 75 and its right edge at 76, the latter also defining the inner edge of the shoulder. A source of illumination is shown as a vehicle headlight 77 and just behind the source is the observation point 78 which normally is an eye of the vehicle driver. The angle 80 between the line 81 from the light source to the delineator 70 and the line 82 from the delineator back to the observation point is conventionally called the angle of observation, and this angle for a given vehicle moving towards the delineator (arrow 84) remains substantially constant as the vehicle moves.

Another angle, conventionally called the entrance angle, changes markedly as the vehicle moves toward the delineator. This is the angle 85 between the horizontal axis 86 of the delineator disc and the line 81 from the center of the disc back to the light source 77. The horizontal axis 86 or centerline of the delineator 70 is the line on which there is the maximum possible reflection of light from the delineator and therefore the closer the light source is to being on this line, the more the light received at the observation point. Conversely, the farther the light source moves from the line 86, the less the light received at the observation point. This is illustrated by the increase in the entrance angle 85 as the vehicle moves toward the delineator, and as this angle increases the amount of light reflected decreases markedly. Thus, by the time the vehicle has reached the mid position shown in FIG. 11, relatively little reflected light is seen at the observation point 78 and when the vehicle reaches the closest position shown there will be no reflection whatsoever. From the FIG. 11 diagram it can also be seen that if the delineator post 71 is twisted any substantial amount to the left or right, or is bent in any direction, it may fail to reflect any light regardless of the position of the vehicle.

In the corresponding diagram of FIG. 12 a delineator embodying the invention is shown at the outer edge 72 of the highway shoulder 74, the delineator being made up of a pair of the hemispherical delineators 15, FIGS. 1 and 2, secured together in the manner shown in FIGS. 7 and 8. In this diagram, the same reference numbers are used for the light source, observation point and angle of observation. The entrance angle, however, is not the same because delineator 15—15 does not have a single horizontal axis or centerline as does the flat faced delineator 70 but rather has an infinite number of lines of maximum reflection coinciding with and comprising extensions of the radii of the delineator. Accordingly, one of these lines will always coincide with the line 81 from the light source to the delineator and the entrance angle will always be zero when delineators embodying the invention are employed. Because of this, the amount of light reflected by delineator 15—15 will not decrease as the vehicle moves toward it but will remain at substantially the same high level until the vehicle is so close that the delineator is no longer within the vehicle beam spread. With the delineator 15—15, or other delineators embodying the invention, there is the added advantage that twisting or bending the support post will not render the delineator inoperative unless the post is bent almost to the ground.

While the delineator of the invention has been described with particular reference to its use as a highway delineator or marker, it will be apparent that it can also be advantageously employed for other applications such as for vehicles, as for example, at the corners of busses, trucks and the like.

From the foregoing description, it will be apparent that the invention provides a novel delineator that is economical to manufacture and install and, more importantly, will make highway travel safer. As will be understood by those familiar with the art, the invention may be embodied in other specific forms without departing from the spirit or essential characteristics thereof.

I claim:

1. A light reflecting delineator having means for securing it to a support, the delineator comprising a molded prismatic reflex portion and a backing portion hermetically sealed to the reflex portion, the reflex portion being in the form of a curved wall adapted to at least partially encircle the support.

2. A delineator as defined in claim 1 wherein the reflex portion is a portion of a hollow cylinder.

3. A delineator as defined in claim 1 wherein the reflex portion is a portion of a hollow sphere.

4. A light reflecting delineator adapted to be mounted on a support post, the delineator comprising a light reflecting portion having reflex reflector prisms molded in the inner side thereof, and a backing portion engaging the inner side of the light reflecting portion in an airtight manner, the backing portion including integral means engageable with the support post for mounting the delineator thereon, the light reflecting portion being in the form of a curved wall adapted to extend around the post for an angular distance of at least 135°.

5. A light reflecting delineator as defined in claim 4 wherein the delineator is formed of two complementary parts which when assembled coact with the post engaging means of the backing portion to secure the delineator in position on the post.

6. A light reflecting delineator as defined in claim 4 wherein the light reflecting portion is a portion of a hollow cylinder.

7. A light reflecting delineator as defined in claim 4 wherein the light reflecting portion is a portion of a hollow sphere.

8. A light reflecting delineator as defined in claim 4 together with a locking plate engageable with the delineator, the locking plate coacting with the post engaging means of the backing portion to secure the delineator in position on the post.

9. A light reflecting delineator adapted to be mounted on a support post, the delineator comprising a light reflecting portion in the form of a thin, curved wall member having a substantially uniform wall thickness, the light reflecting portion having reflex reflector prisms molded in its inner side and having a substantially smooth outer side, a backing portion hermetically sealed to the inner side of the light reflecting portion, the backing portion being in intimate physical contact with the molded prisms, the delineator being adapted to at least partially encircle the support post.

* * * * *